Figure 1:
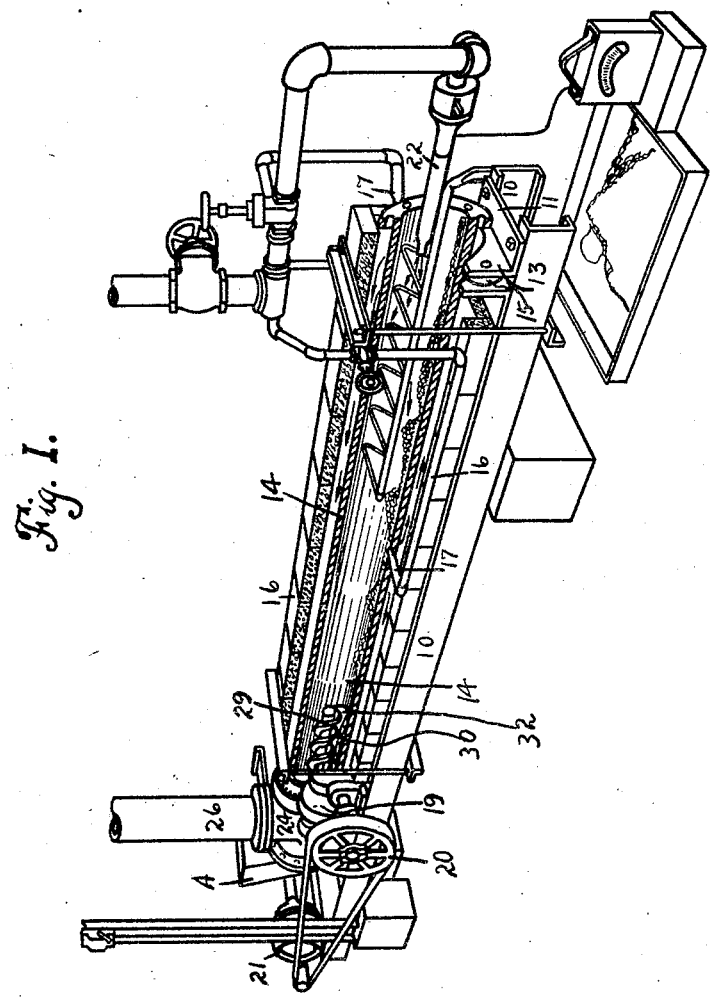

Aug. 4, 1925.

C. W. AVERY 1,548,575

ROUGE BURNING MACHINE

Filed Jan. 13, 1922

2 Sheets-Sheet 1

WITNESS:

John M. Cahill.

INVENTOR.
C W Avery
BY
E L Davis
ATTORNEY.

Aug. 4, 1925.
C. W. AVERY
1,548,575
ROUGE BURNING MACHINE
Filed Jan. 13, 1922   2 Sheets-Sheet 2
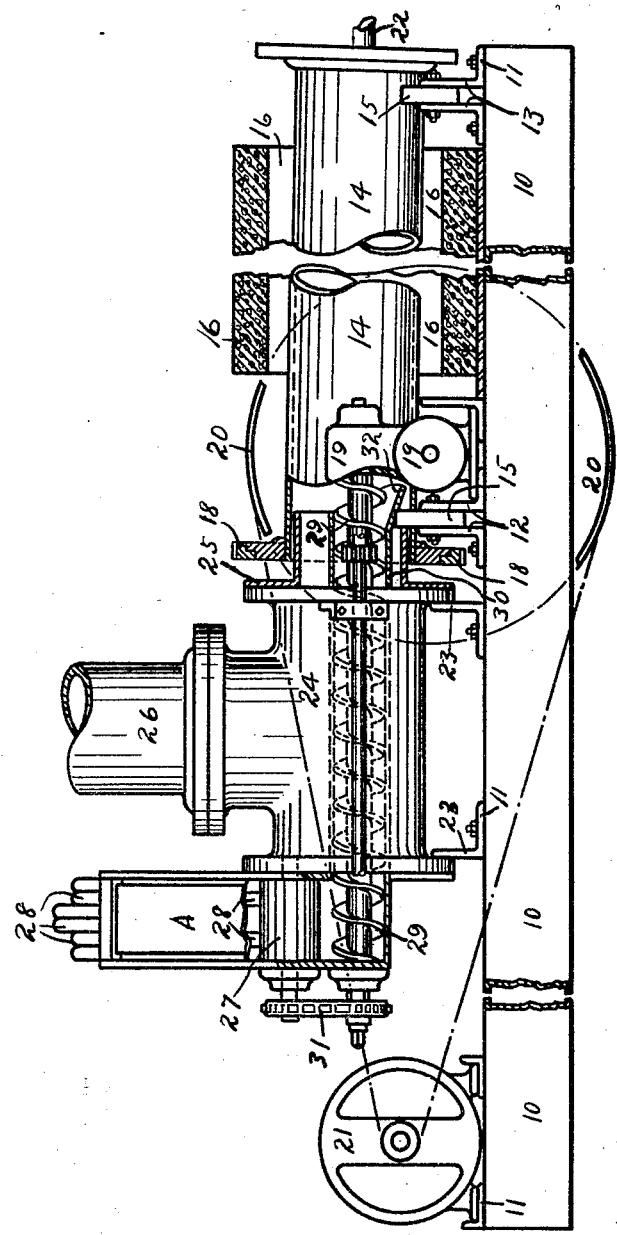
WITNESS:
John M. Cahill.
INVENTOR.
C W Avery
BY
E L Javris
ATTORNEY.

Patented Aug. 4, 1925.

1,548,575

UNITED STATES PATENT OFFICE.

CLARENCE W. AVERY, OF DETROIT, MICHIGAN, ASSIGNOR TO FORD MOTOR COMPANY, OF DETROIT, MICHIGAN, A CORPORATION OF DELAWARE.

ROUGE-BURNING MACHINE.

Application filed January 13, 1922. Serial No. 528,887.

*To all whom it may concern:*

Be it known that I, CLARENCE W. AVERY, a citizen of the United States, residing at Detroit, in the county of Wayne and State of Michigan, have invented new and useful Improvements in a Rouge-Burning Machine, of which the following is a specification.

The object of my invention is to provide a new and useful machine for burning rouge or the like of simple, durable, and inexpensive construction.

A further object of my invention is to provide a device adapted for the drying or evaporating of water from iron sulphate which is commonly called copperas.

It may be in order to explain that in connection with pickling tanks now in use, a sludge is formed in the bottom of these pickling tanks which comprises a solution of iron sulphate and that this sludge is drawn off from these tanks when a certain amount of it has been accumulated. This material then is dried partially by any suitable means, as by draining off the liquor or by a centrifugal drier, thereby forming a blue-green crystalline substance known as iron sulphate, or copperas. This material still has a large percentage of moisture therein and has been largely wasted in the past as it was ordinarily merely hauled to a dump or otherwise disposed of as refuse. Experiments have shown, however, that this material may be heated and thoroughly dried out to drive off the sulphuric acid, or sulphate therein, thereby leaving a substantially pure dry iron oxide. This oxide is peculiarly adapted for use commerically under the name "rouge" and is largely used in connection with the finishing and more especially the final polish of the surfaces of glass.

I have tried various methods for heating the copperas to drive off the sulphuric acid and have found that the method herein described is most satisfactory in that it eliminates, most efficiently, the sulphuric acid and at the same time leaves the resulting iron oxide in the form of a very fine powder which is perfectly dried and therefore adapted for the purposes intended.

With this explanation in mind it is the object of my invention to provide a method for burning copperas and a machine for accomplishing that method which will efficiently produce rouge of the desired quality and quantity.

A further object of my invention is to provide a burning machine particularly adapted to pulverize the copperas and remove the sulphuric acid therefrom with a minimum amount of heat and a minimum amount of escape of the confined sulphuric acid fumes.

A further object of my invention is to provide a machine having an especially devised heating chamber associated therewith and a material-supplying device also associated therewith, whereby the copperas may be operated upon continuously to continuously produce the rouge.

With these and other objects in view, my invention consists in the arrangement, combination, and construction of the various parts of my improved device, as described in the specification, claimed in my claims, and shown in the accompanying drawings, in which:

Figure 1 shows a perspective view of one form of an improved machine for carrying out my method of burning copperas, parts being broken away to better illustrate the construction, and Figure 2 illustrates a side elevation of such machine, parts being broken away to better illustrate the construction.

Referring to the accompanying drawings, I have used the reference numeral 10 to indicate, generally, a channel iron frame having spacing members 11 associated therewith to thereby form a rectangular base for my improved machine. Mounted adjacent to either end of the base 10 are vertical brackets 12 and 13 which extend across the frame. These brackets are disposed in pairs and have their upper edges curved to fit a tubular oven member 14. This oven member 14 is designed to rotate on rollers 15, disposed between the pairs of brackets 12 and 13. The rear brackets 12 are slightly higher than the forward brackets 13, so that the axis of the tubular oven member 14 is slightly inclined. Surrounding the tubular member 14 is a heat-retaining wall 16 or casing, which, in the form shown, is rectangular in cross-section and designed to form a chamber between the tubular member 14 and the walls of such member 16, and into these, burners 17 are directed for the purpose of heating the chamber around the walls of the tubular member 14; at one end of the tubular member 14, a ring gear 18 is secured and a suitable reduction gearing 19 drives or rotates the tubular member 14 by means of a pulley wheel 20 which is connected to a motor 21. A burner 22 is directed into the lower or discharge end of the tubular member 14 for the purpose of heating the interior of the tubular member.

From the construction of the parts just described it will be observed that if copperas be fed into the upper or receiving end of the tubular member 14 then when the motor 21 is actuated the tubular member 14 will be rotated. Due to the inclined axis of this tubular member the copperas fed to it at its receiving end will be rolled over and over and gradually downwardly toward the discharge end. During its downward progress along the tubular member 14 the copperas is subjected to two different heat actions, namely, the heat of the walls of the tubular member 14, due to the heat of the burners 17, and the heat of the air passing thru the tubular member which has been heated by the burner 22 at the discharge end thereof and the products of combustion from such burner. It will thus be seen that I am enabled to take advantage of all three methods of imparting heat, namely, conduction, convection, and radiation, in heating this copperas to drive off the sulphuric acid and thereby form the iron oxide or rouge. It will also be noted that the movement of the copperas both in rolling around the tubular member and in passing from one end to the other is wholly automatic and without the use of screws, blades, or the like for causing such movement, so that a maximum amount of the heat actually used may be devoted to the purposes for which the machine is intended.

Associated with the oven portion of the machine I have provided the following mechanism for feeding the copperas continuously to the oven and for carrying off safely the fumes of the sulphuric acid: At the receiving end of the tubular member 14 a pair of brackets 23 support a flanged T casting 24; this casting or head has a flanged sleeve 25 screwed to the end thereof adjacent to the oven and which extends into the oven, and forming therewith a very nearly gas-tight joint. The top opening of the head 24 is connected to a suitable vent pipe 26 which leads to the outer air or to a reclaiming plant for recovering the sulphuric acid in suspension. At the end of the casting or head 24 opposite the tubular oven 14 is a hopper device A designed to receive the copperas which is to be fed into the oven for burning. This hopper is provided with a feed roll 27 at the bottom thereof and sectional gate members 28 which may be simultaneously or independently raised to vary the amount of copperas fed out from the hopper A by a given amount of rotation of the feed roller 27. In the bottom of the hopper A, below the feed roller 27, is a positive feeding device 29 which is here shown in the form of a worm or screw enclosed in a casting 30 which extends thru the head 24 and into the tubular oven 14. This screw may be rotated in any suitable manner as by a chain 31, which may be connected to any suitable source of power, and the feed roller 27 is preferably driven at a fixed rate of speed relative to the screw, as by extending the chain 31 over a sprocket on the end of the feed roller shaft. The oven end of the screw casting 30 has a lip 32 thereon to cause the copperas forced thru the housing by the screw to drop off on to the bottom of the tubular oven 14 and at the same time to allow the copperas to be slightly heated before it drops on to the bottom of the oven instead of dropping directly from the end of the screw so that it will not be so tightly packed at the time it drops on to the bottom of the oven.

The operation of the machine has been brought out specifically in connection with the description of the various parts but it is in order to describe the operation consecutively in order that the advantages of the machine may be more fully brought out. The first step is to load the hopper A, with iron sulphate or copperas, and then to start the motor 21 thereby revolving the tubular oven 14 on its longitudinal axis and starting the screw 29 and feed roller 27. The heat from the burners 22 and 17 will both heat the walls of the tubular member 14 and cause a current of very hot air and the products of combustion to pass along the tubular oven 14 to be discharged thru the stack 26. The gates 28 should be set to permit copperas to pass out from the hopper into the screw casting 30 at the time the machine is started and then the condition of the rouge or iron oxide as it comes out from the discharge end of the tubular oven will inform the operator as to whether it is advisable to allow more copperas to pass thru by opening the gates 28 further, or to close the gates 28 slightly to cut down the amount of copperas passing thru the machine. The ideal condition for rouge is to have all, or substantially all, the sulphuric acid removed therefrom by the heat, and of course the moisture which is part of the sulphuric acid. If greater production is desired, the burners can be increased in number or amount of gas supplied thereto and the machines speeded up and perhaps the gates 28 opened somewhat. If a less production is desired or if the rouge as it comes from the tubular oven is not sufficiently burned then the machine may be slowed down by cutting down the current supplied to the electric motor 21, or the gates 28 may be closed slightly, or both.

Among the many advantages arising from the use of my improved machine, it may be mentioned that it permits a continuous production of rouge of substantially uniform quality.

A further advantage resides in the fact that an operator may watch the quality of the rouge produced and vary the heat, speed, or feed conditions, to instantly remedy any trouble with the rouge resulting from the operation of the machine itself.

A further advantage resides in the type of machine used in that small quantities of the rouge are subjected to a uniform heat action during their progress thru the machine so that all parts of the resulting rouge are of substantialy uniform quality. This last advantage is very important, as where rouge is baked in an ordinary kiln in batches, then parts of the batch vary in quality so that where the rouge is used for polishing glass or similar purposes then the quality of the glass resulting is seriously affected by the variations in the quality of the rouge. As rouge is largely used in the polishing of glass and similar materials and as uniform polish on such materials is absolutely essential, it will be seen that it is a very important advantage of my machine and method to be able to secure rouge of uniform quality.

A further advantage resulting from the use of my improved machine and method is that all of the rouge is subjected both to the heat of the walls of an oven by actual contact with the walls and also the heat of a current of very hot air passing along over the rouge at the time that it is being agitated by the motion of the tubular oven. Heat is therefore imparted to the copperas to drive off the sulphuric acid by conduction, convection, and radiation, so that all three methods of imparting heat are used thereby securing the advantages of each. Furthermore, the rouge while being agitated and while in very smal quantities is subjected to the action of a current of very hot air passing over it and thereby causing a current of heated air to come into direct contact with the very large proportion of the particles of copperas which materially decreases the amount of heat required for driving off the sulphuric acid from the copperas.

Some changes may be made in the arrangement and construction of the various parts of my improved device without departing from the spirit of the invention therein and it is my intention to cover by my claims such changes as may be reasonably included within the scope thereof.

I claim as my invention:

1. In a machine for burning copperas to form rouge, a rotary tubular oven having its axis inclined whereby material fed to the upper end of the oven may be automatically carried to the lower end thereof by being subjected to the action of heat, a stack for carrying away the gases from said oven and communicating with the upper end thereof, means for forcing the material treated by said oven into the oven adjacent to said stack, a fixed trough adapted to receive material from said means and to retain said material while exposed to the heat of the oven for a predetermined period of time before allowing the material to drop on the walls of the oven.

2. In a machine for burning copperas to form rouge, a rotary tubular oven having its axis inclined whereby material fed to the upper end of the oven may be automatically carried to the lower end thereof by being subjected to the action of heat, a stack for carrying away the gases from said oven and communicating with the upper end thereof, means for forcing the material treated by said oven into the oven adjacent to said stack, and a fixed trough adapted to receive material from said means and to retain said material while exposed to the heat of the oven for a predetermined period of time before allowing the material to drop on the walls of the oven. A storage means associated with the means for forcing the material into the oven, said storage means being disposed adjacent to said stack whereby the material may be partially dried from the heat of the stack before being subject to the heat of the interior of the oven.

Dated January 6, 1922.

CLARENCE W. AVERY.